United States Patent [19]

Fryer

[11] 3,767,885
[45] Oct. 23, 1973

[54] BANDING MACHINE AND METHOD
[75] Inventor: George R. Fryer, Ansonia, Conn.
[73] Assignee: Fryer Corporation, Oxford, Conn.
[22] Filed: Aug. 13, 1971
[21] Appl. No.: 171,544

[52] U.S. Cl.................. 219/56, 100/26, 100/29, 219/58
[51] Int. Cl... B23k 11/00, B65b 13/04, B65b 13/24
[58] Field of Search .................. 219/83, 56, 57, 58, 219/95, 96, 97; 100/26, 29, 33

[56] References Cited
UNITED STATES PATENTS

| | | | |
|---|---|---|---|
| 2,356,904 | 8/1944 | Workman | 100/29 X |
| 2,409,652 | 10/1946 | Workman | 100/29 X |
| 3,654,423 | 4/1972 | Phillips et al. | 219/95 |
| 2,864,303 | 12/1958 | Brown et al. | 100/29 |
| 3,313,911 | 4/1967 | Seeloff | 219/83 X |
| 3,183,824 | 5/1965 | Cook | 100/26 |

Primary Examiner—J. V. Truhe
Assistant Examiner—Hugh D. Jaeger
Attorney—DeLio & Montgomery

[57] ABSTRACT

This specification discloses a wire banding machine which comprises a base member, a circular guideway and wire feeding and tensioning means. Wire is fed across the base and past an article to be bound and then around the guideway until the leading edge thereof strikes a stop. At this time, clamping means on a first member on the base clamps and holds the leading end of the wire. Then the feeding means is reversed to tension the wire about the article. At the end of the tensioning step a second member on the base clamps the wire and moves across a severing means into alignment with the leading edge. As alignment with the leading edge is approached the second member slightly retracts to allow such alignment to take place and then is moved inwardly to bring the ends into contact as a welding current is passed across the aligned ends to effect a weld therebetween.

15 Claims, 21 Drawing Figures

PATENTED OCT 23 1973 3,767,885

INVENTOR
George R. Fryer

BY De Lio and Montgomery
ATTORNEYS

BANDING MACHINE AND METHOD

This invention relates to banding or tying machines, and more particularly relates to such machines of the type where the ends of a band are welded together.

In banding or loop-tying machines, a length of wire or strapping is passed around the object to be banded, tensioned and then the ends joined. This requires a feeding means and tensioning means together with clamping of the wire and severing thereof. Thereafter, the ends must be moved into a predetermined position for tying or welding.

There are no presently known banding machines which will efficiently band and weld the ends of a band either in a butting or lapping relationship.

Accordingly, the present invention provides a new method and apparatus for effecting such banding and welding operation. In the present invention, a minimum number of motions and distances of travel are required to effect the operation. A machine embodying the invention has a minimum number of moving parts, and the motions thereof provide plural steps in the overall operation. The means for clamping the wire may include the welding electrode and also the wire severing means. The motion of a first member to align the ends of the wire also produces severing of the wire and initiation of a welding cycle at the ends thereof.

An object of this invention is to provide a new and improved method and apparatus for banding articles and welding the ends of the banded wire.

Another object of this invention is to provide a machine of the type described which is rapid in operation and has a minimum number of moving parts.

A further object of this invention is to provide a machine of the type described in which the basic operations are accomplished through a wire feeding means and first and second members which are slidable on a base member to effect control of the feeding means, clamping and severing of the wire and alignment and welding of the ends thereof.

Briefly stated the invention in one form thereof comprises a base member, a circular guideway and wire feeding and tensioning means. Wire is fed across the base and past an article to be bound and then around the guideway until the leading edge thereof strikes a stop. At this time, clamping means on a first member on the base clamps and holds the leading end of the wire. Then the feeding means is reversed to tension the wire about the article. At the end of the tensioning step a second member on the base clamps the wire and a portion thereof moves across a severing means into alignment with the leading edge. As alignment with the leading edge is approached the second member slightly retracts to allow such alignment to take place and then is moved inwardly to bring the ends into contact as a welding current is passed across the aligned ends to effect a weld therebetween.

The features of the invention which are believed to be novel are particularly pointed out and distinctly claimed in the concluding portion of this specification. The invention, however, both as to its organization and operation, together with further objects and advantages thereof may best be appreciated by reference to the following detailed description taken in conjunction with the drawings, wherein:

Figure 1:
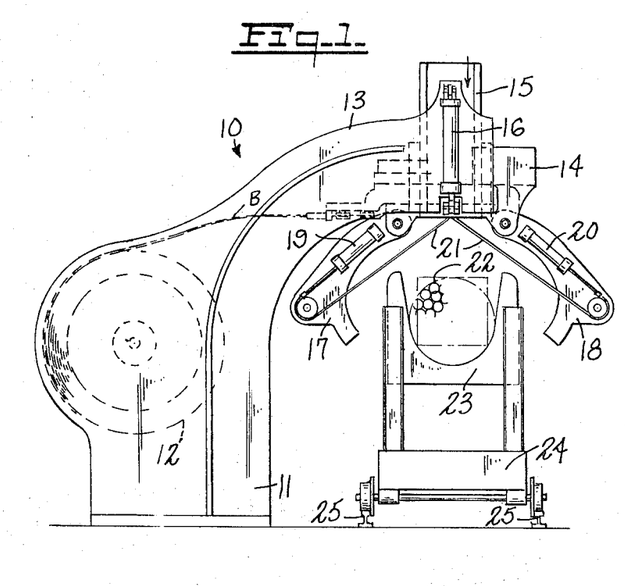
FIG. 1 is a front elevation of apparatus embodying the invention.
Figure 2:
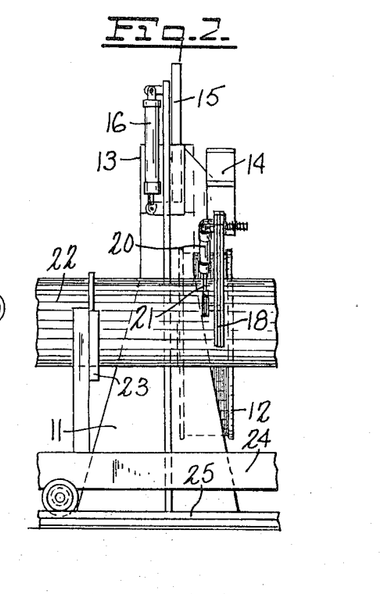
FIG. 2 is a side elevation of the device of FIG. 1.
Figure 3:
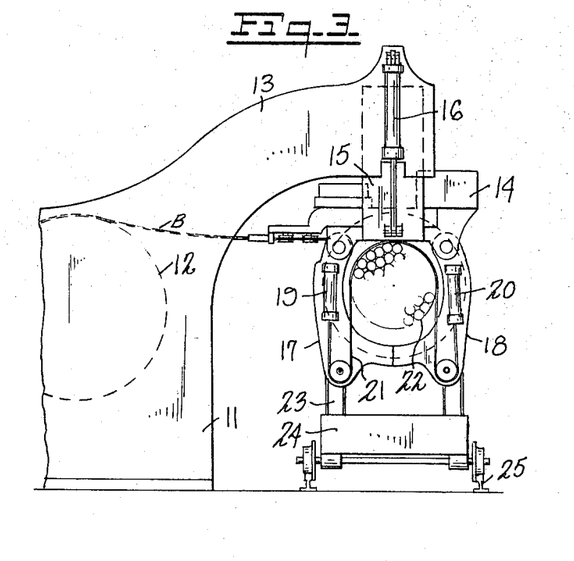
FIG. 3 is a view similar to FIG. 1 but with material engaging arms closed.

The apparatus 10 shown in FIGS. 1 – 3 generally comprises an upright stand 11 rotatably mounting a reel 12 upon which banding wire is carried. A cantilevered portion 13 overhangs the material to be operated upon and includes a base member 14 carried on a vertically movable slide 15 under the control of a hydraulic cylinder 16. Pivotally mounted to base member 14 are arm members 17 and 18 each having mounted thereto a cylinder 19 and 20, respectively, adapted to draw the arms together as shown in FIG. 3. Cables or other flexible holding devices 21 are attached to the piston rod of cylinders 19 and 20.

The device as shown is arranged to band a bundle of rods 22 carried in fixtures 23 on trolleys (only one shown) or transfer carts 24 movable on rails 25 beneath the base 14.

When a banding operation is to be performed, the cylinder 16 is actuated to move base 14 down onto the bundle 22 and cylinders 19 and 20 are actuated to close arms 17 and 18, respectively, about the bundle of rods 22 and tension the cable 21 thereabout to compact the bundle against the fixture 23. The arms 17 and 18, when closed, further define a guideway to guide the banding wire about the articles to be banded. The banding wire B is drawn from reel 12 by pairs of drive rollers 26 and 27.

Figure 4:
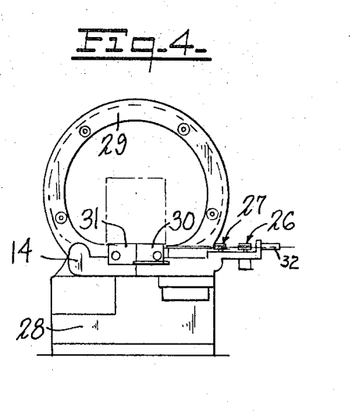
FIG. 4 is an elevation of the banding mechanism embodied in the machine of FIGS. 1 – 3, but in an inverted position for ease of illustration.
Figure 5:
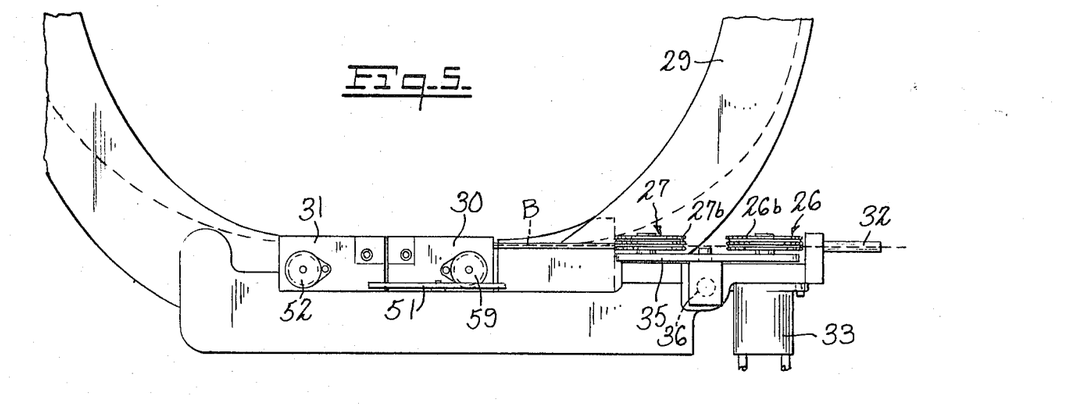
FIG. 5 is an enlarged view of a portion of FIG. 4.
Figure 6:
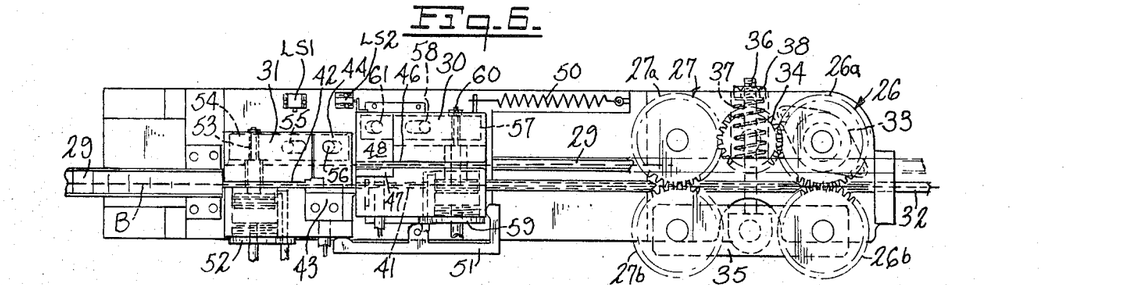
FIG. 6 is a top plan view of the mechanism of FIG. 5.
Figure 7:
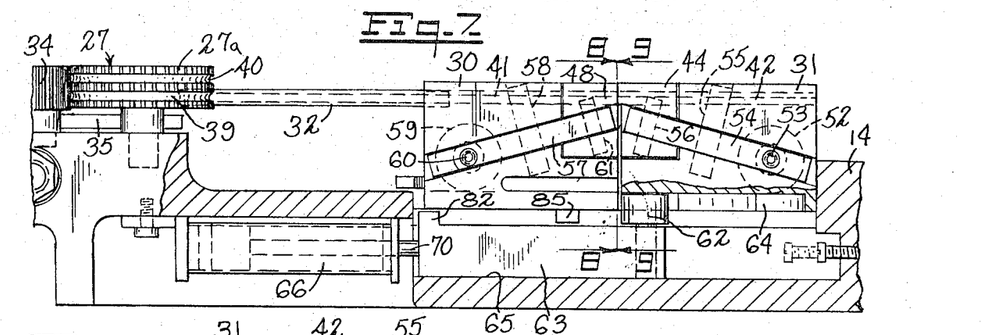
FIG. 7 is an enlarged view of a portion of the mechanism of FIG. 5, partly in section, and seen from the other side thereof.

Reference is now made to FIG. 4 which for simplicity of illustration shows the base 14 in a position 180° with respect to its position in FIGS. 1 – 3. The base 14, as shown in FIG. 4, is supported on a pedestal 28 and further supports a guideway 29 which is of generally U-shape to provide a guide channel or path for the wire B as it is drawn through the feeding means comprising the drive roller pairs 26 and 27. Carried on base 14 for movement thereon are first and second members 30 and 31, hereinafter referred to as a nose slide and a tail slide, respectively.

The mechanism hereinafter described may better be appreciated with an outline of the operative steps thereof.

The wire B is fed through sleeve 32 and guideways in members 30 and 31 about guideway 29 until it returns and the leading edge thereof strikes a contact indicating that a complete loop has been made. At this time a clamping means on member 30 is actuated to hold the leading edge of the wire and the feed means is reversed to tension the wire about the article. At the end of the tensioning step, the wire is clamped in the member 31. The member 31 is moved transversely of base 14 severing the wire, and the member 30 is retracted slightly to permit alignment of the ends. When the ends are aligned, the member 30 is moved toward member 31 and the ends of the wire are fused by welding.

Reference is now made to FIGS. 5 – 9 for a detailed description of the mechanism. The wire B passes through a first set of drive rollers or wheels 26 comprising gears 26a and 26b. The sleeve 32 is cut away intermediate the pairs of wheels 26a, 26b and 27a, 27b, to provide engagement between the wheels and the wire. The wheel pairs 26 and 27 are driven by means of a hydraulic motor 33. Motor 33 drives wheel 26a which is geared to wheel 26b directly, and to wheel 27a through an idler 34. Wheel 27a is directly geared to wheel 27b. The wheels 26b and 27b are rotatably mounted on a support 35 carried on the end of a support shaft 36. A spring 37 urges a headed or nutted end 38 of shaft 36 away from support 35 to urge wheels 26b and 27b toward engagement with wheels 26a and 27a and thereby compressively engage the wire in the wheel grooves 39 or 40. This will compensate for possible different sizes of banding wire. The wheels 26a, 26b and 27a, 27b are provided with grooves 39 and 40 of different size to accommodate various sizes of wire.

The banding wire is fed through sleeve 32 into a passage 41 (FIG. 9) defined through nose slide 30 and through passage 42 (FIG. 8) defined through tail slide 31, between a stationary clamping member 43 and a movable clamping member 44. Stationary clamping member 43 also incorporates a suitably insulated welding electrode or contact 45a, FIG. 8.

Figure 9:
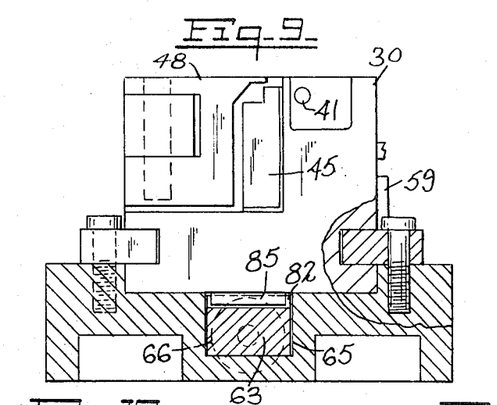
FIG. 9 is a view seen in the plane of lines 9—9 of FIG. 7.

The banding wire B is fed through passage 42 between clamping members 43 and 44 into guideway 29, about the guideway and into passage 46 defined between a stationary clamping member 47 and a movable clamping member 48. The banding wire then proceeds until the leading edge thereof closes an electrical contact 49 on slide 31, FIGS. 10, 11. This will commence a cycle of operation as hereinafter described. The stationary clamping member 47 includes the other welding electrode or contact member 45 (FIG. 9).

Nose slide 30 is movable a slight distance under the influence of a spring 50 when tail slide 31 moves transversely across base 14 and allows holding lever 51 to pivot slightly. Movement of tail slide 31 to a given position transversely of base 14 is sensed by a normally open limit switch LS1, and movement of nose slide 30 to a complete welding position is sensed by a normally closed limit switch LS2, both on base 14. Movable clamping member 44 on tail slide 31 is actuated through a cylinder 52 carried in slide 31 and having a rod 53 which pivots a lever 54 at one end thereof about a pin 55 carried in slide 31, as may be more clearly seen in FIG. 7. Lever 54 is attached to a pin 56 at the other end thereof. Pin 56 is carried in movable clamping member 44. In a similar manner, movable clamping member 48 on nose slide 30 is actuated through a lever 57 about a pivot pin 58 by a cylinder 59 having a rod 60 connected to one end of lever 57 as most clearly shown in FIG. 7. Lever 57 is connected to clamping member 48 by means of a pin 61 carried in member 48.

The welding electrode or contact 45 is suitably insulated from slide 30 by insulation 45b. Additionally, the movable clamping member is insulated from slide 30 at the lower surface thereof (insulation not shown). The movable clamping member is preferably further insulated from slide 30 by a sleeve (not shown) about pin 61 and insulation between the surfaces thereof in proximity to slide 30 and lever 57. The electrode or contact 45 on tail slide 31 is the ground contact and need not be insulated from movable clamp 44.

Tail slide 31 is moved transversely of base 14 by means of a cam roller 62 carried on a slide 63 and received in a cam slot 64 defined in the underside of tail slide 31. Slide 63 is movable in a guideway 65 therefor in base 14. Slide 63 is actuated by a cylinder 66 carried on base 14.

Figure 8:
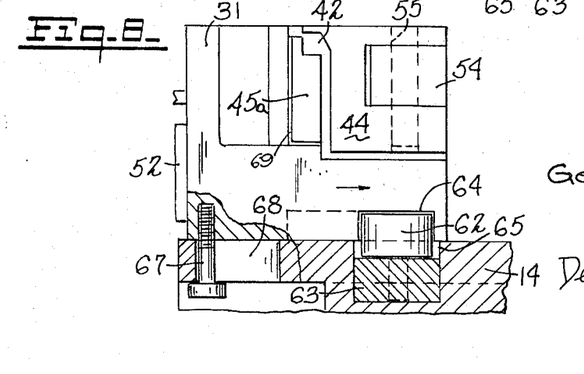
FIG. 8 is a view seen in the plane of lines 8—8 of FIG. 7.

As shown in FIG. 8, tail slide 31 is secured to base 14 as by means of a plurality of bolts 67 which extend through elongated plate 68 in base 14. As further shown in FIG. 8, the stationary clamping member 43 which may include insulating members 69 and electrode 45 may be demounted and replaced as may be required through wear. Electrode 45 or other portions of clamping member 43 includes a severing edge 71 for severing the wire B when slide 31 moves transversely of base 14. When the rod 70 of cylinder 66 is extended, roller 62 of slide 63 moving in slot 64 will move slide 31 transversely of base 14 toward limit switch LS1, as more clearly exemplified in FIGS. 13 and 14.

Figure 16:
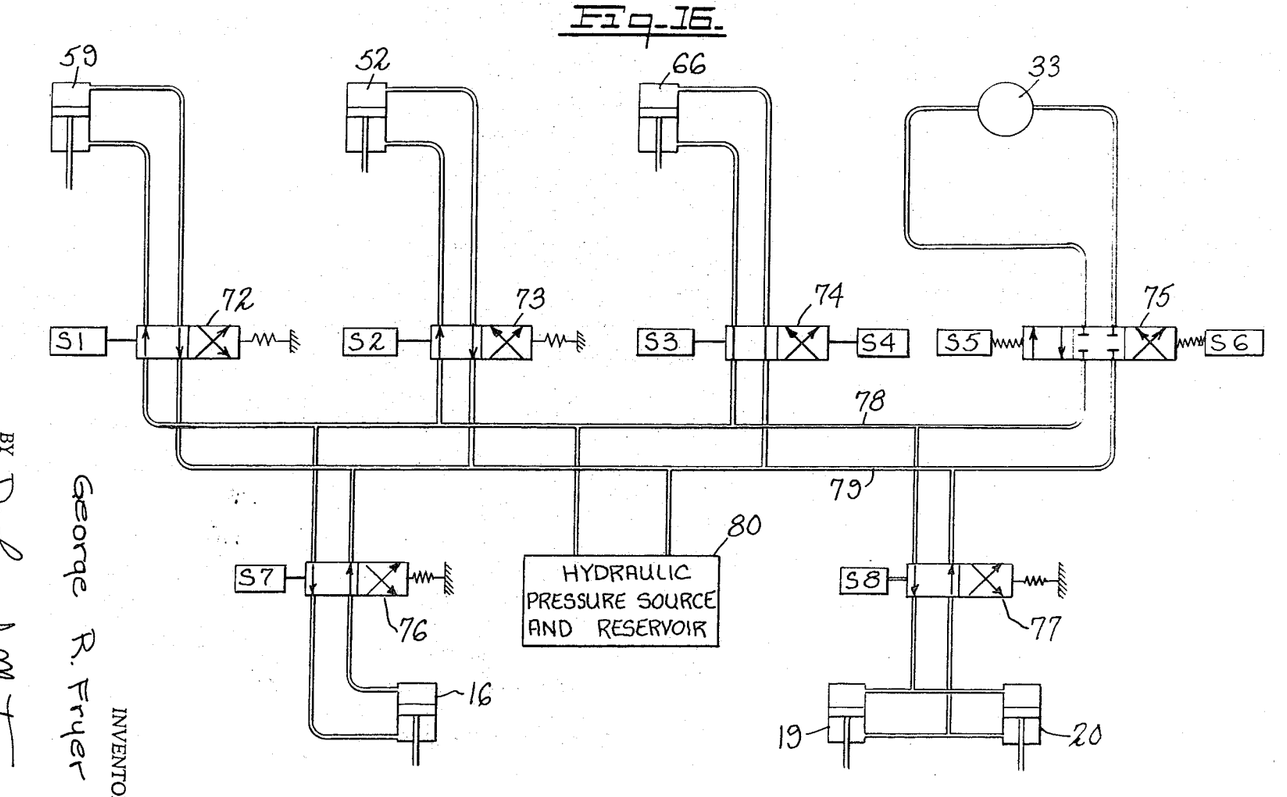
FIG. 16 is a diagram of the hydraulic controls utilized in the machine.

With reference to FIG. 16, cylinder 59 which operates the movable clamping member 48 on slide 30 is operated through a two-way valve 72 by a solenoid S1. Cylinder 52 which operates the movable clamping member 44 on slide 31 is operated through a two-way valve 73 by a solenoid S2.

Cylinder 66 which moves slide 31 transversely of base 14 is operated by a two-way valve 74. Valve 74 is positioned to advance slide 63 (left-to-right as viewed in FIG. 7) when solenoid S4 is energized and retract slide 63 when solenoid S3 is energized.

Valve 75 is positioned to drive motor 33 in a feeding direction when solenoid S5 is energized and to drive motor 33 in the reverse direction to tension the wire when solenoid S6 is energized. Valve 75 also has a neutral position as shown.

Valve 76, when positioned by solenoid S7 causes cylinder 16 to move slide 15 with base 14 thereon downwardly when solenoid S7 is energized and to raise slide 15 when solenoid S7 is not energized.

Valve 77 is positioned when solenoid S8 is energized to cause cylinders 19 and 20 to close arms 17 and 18. When solenoid S8 is not energized, valve 76 is positioned to cause cylinders 19 and 20 to open arms 17 and 18.

The valves 72 – 77 and their controlled cylinders are connected to hydraulic pressure line 78 and return line 79. Hydraulic fluid is provided to line 78 from a pressure source 80 and returned to a reservoir in a well known manner. The hydraulic system includes the usual pressure regulating and relief valves, not shown.

Figure 17:
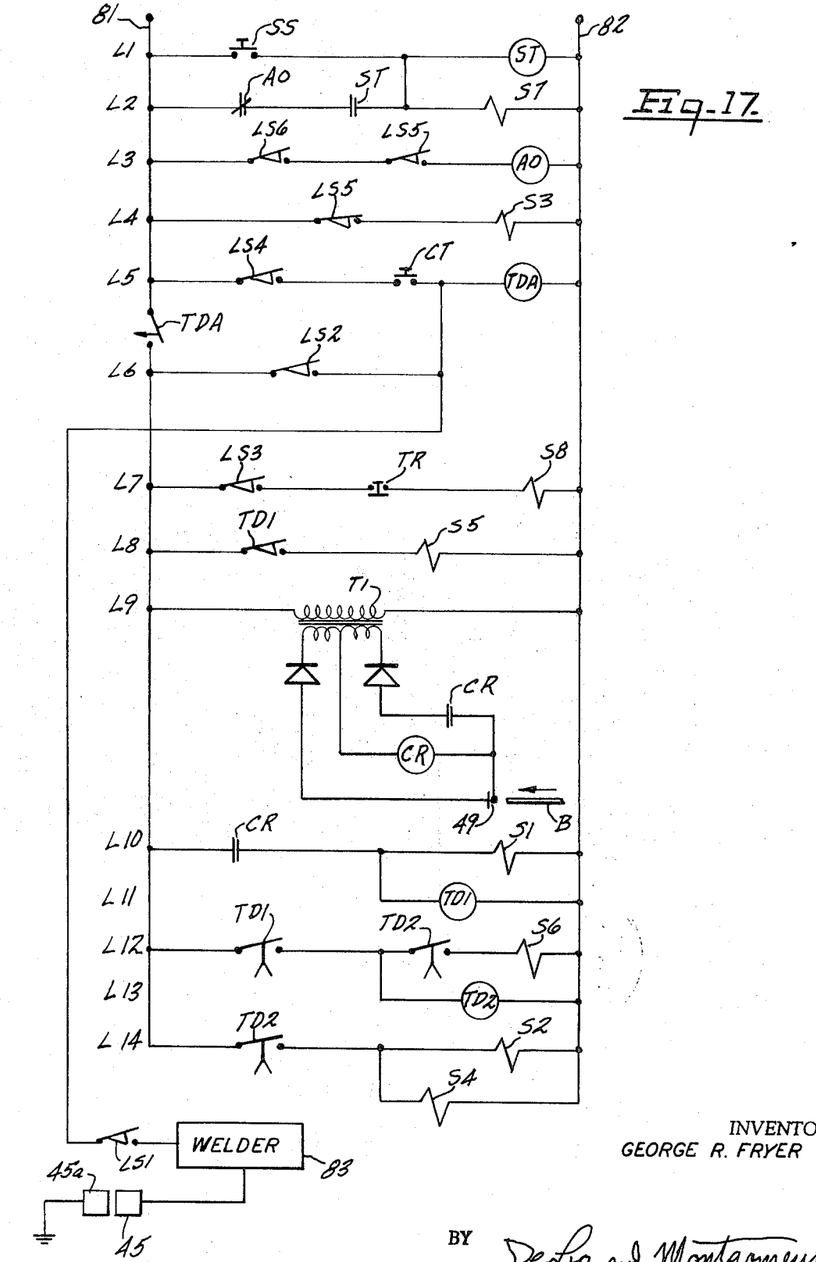
FIG. 17 is a schematic diagram of the electrical controls utilized in the machine.
Figure 18:
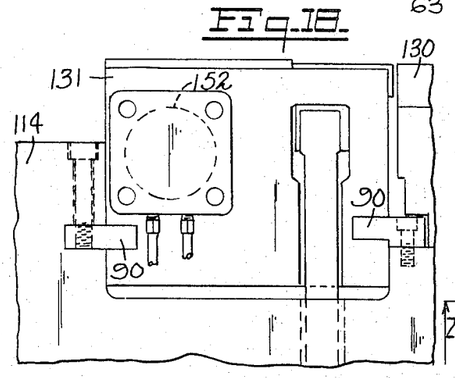
FIG. 18 is a side elevation of a first slide member of a machine having an alternate construction.
Figure 19:
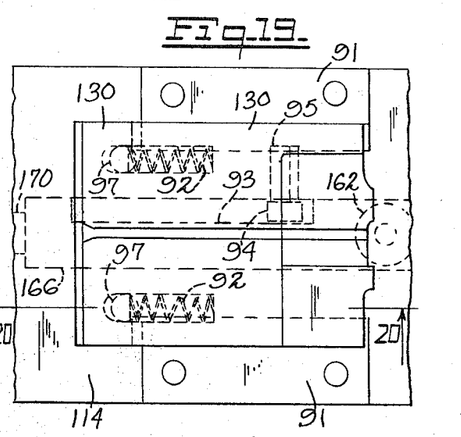
FIG. 19 is a top plan view of a portion of the machine of FIG. 18 showing a second slide member.
Figure 20:
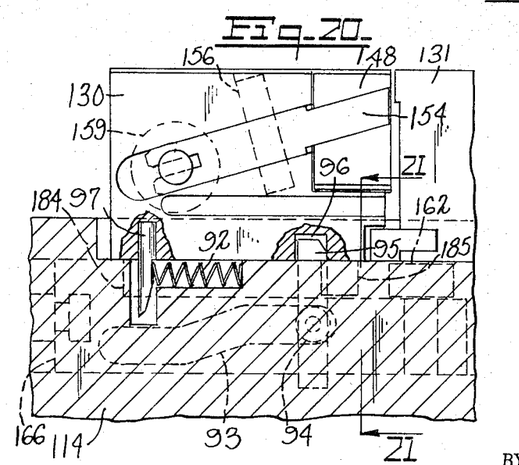
FIG. 20 is a view seen in the plane of lines 20—20 of FIG. 19.
Figure 21:
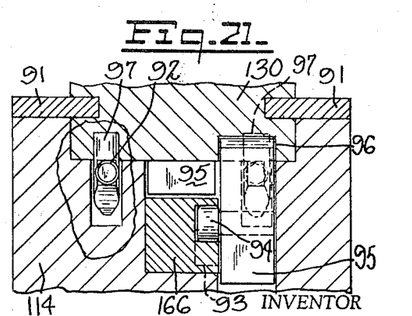
FIG. 21 is a view seen in the plane of lines 21—21 of FIG. 20.

The method of banding and operation of the machine may best be appreciated by reference to the sequence of FIGS. 10 – 14 and the schematic diagram of FIG. 17.

To commence a banding operation, an article such as a bundle of rods or pipes 22 is positioned beneath the machine as shown in FIG. 1. Then a start switch SS, FIG. 17, is momentarily closed to energize a relay ST in line L1 between bus lines 81 and 82.

When relay ST is energized, it latches itself in through its controlled contact in line L2 and also energizes solenoid S7 which causes cylinder 16 to move slide 15 downwardly. When the slide closes a limit switch LS3 in line L7, whose position has been predetermined by the size of the articles to be banded, solenoid S8 in line L7 is energized to position valve 77 to cause cylinders 19 and 20 to close arms 17 and 18 about the bundle or rods. When the ends of the arms are in engagement as shown in FIG. 3, a limit switch LS4 in line L5 is momentarily closed which energizes time delay relay TDA. A limit switch LS5 having contacts in lines L3 and L4 senses when the slide is in its upper position. The contact in line L3 is opened when slide 15 is in its upper position. The contact in line L4 is closed when slide 15 is in its upper position. Line L5 optionally includes a banding cycle start switch CT. When switch CT is closed, relay TDA is energized and picks up its controlled contact in line 81, and is latched through normally closed limit switch LS2, line L6. The timing feature of relay TDA is utilized to open its contact a short time after it is de-energized.

Figure 10:
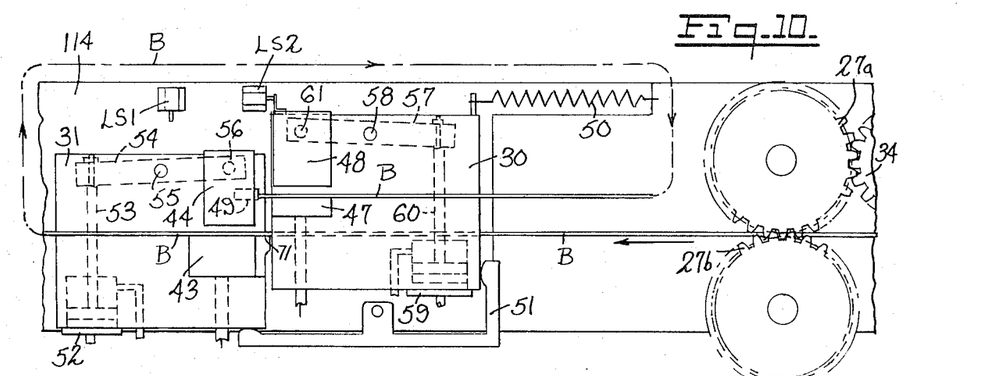
FIGS. 10, 11, 12, 13, and 14 are plan views similar to FIG. 6 but showing various positions of the elements of the mechanism to exemplify the operation thereof.
Figure 11:
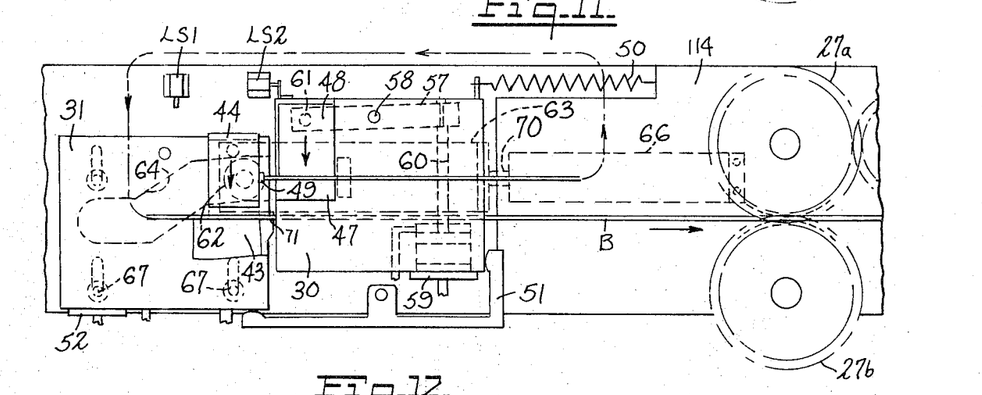

When contact TDA in line 81 is closed, solenoid S5 in line L8 is energized through normally closed contact TD1. This positions valve 75 to cause motor 33 to feed wire B as previously described. Transformer T1 being energized through the TDA contact, energizes relay CR when the wire strikes contact 49 (FIG. 10). Relay CR latches itself and closes its contact in L10 to energize solenoid S1. Solenoid S1 positions valve 72 to cause cylinder 59 to actuate clamp member 48 and clamp the leading edge of wire B in nose slide 30 (FIG. 11).

At the same time, delay relay TD1 in line L11 is energized, and after a brief time delay, closes its contact in line L12 to energize solenoid S6, and opens its contact in line L8 to de-energize solenoid S5. Motor 33 now reverses for a period of time determined by time delay relay TD2 in line L16. This time is set for a predetermined tensioning cycle. When relay TD2 times out, it opens its contact in line L12 to de-energize solenoid S6 and halt operation of motor 33 to tension the wire.

Figure 12:
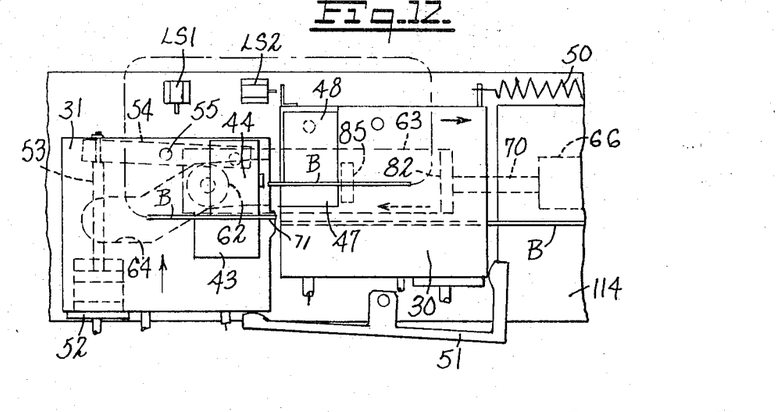
Figure 13:
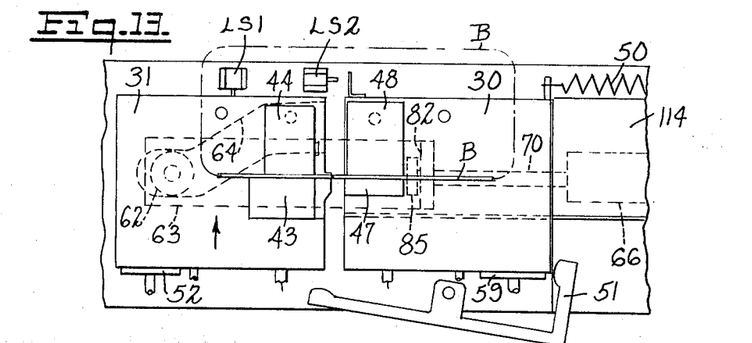

Simultaneously, relay TD2 closes its normally open contact in line L14 to energize solenoids S2 and S4. When solenoid S2 is energized, clamping member 44 on slide 31 clamps the wire (FIG. 12). At the same time, solenoid S4 positions valve 74 to cause cylinder 66 to advance slide 63 and move tail slide 31 transversely of base 14 as shown in FIGS. 12 and 13. As shown in FIG. 12, the wire is severed during this movement of slide 31.

Figure 14:
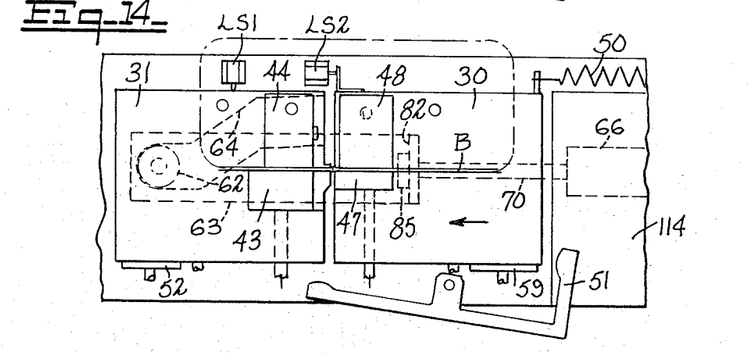

As slide 31 moves toward limit switch LS1, it releases lever 51 to permit slide 30 to slightly retract (FIGS. 13 and 14). When slide 31 closes limit switch LS1 the ends of the wire are aligned and a welder 83 is energized across electrodes or contacts 45 and 45a. As the welding current is applied across the ends of the wire, a shoulder 82 on slide 63 engages a lug 85 on slide 30 (FIG. 7), urges the molten ends of the wire in engagement, and causes nose slide 30 to open limit switch LS2 in line L6. This shuts down the welder 83. Relay TDA is also de-energized when switch LS2 opens. After a brief time delay which permits the welded ends of the wire to cool and fuse, contact TDA in line 81 opens.

When the TDA contact opens, solenoids S1, S2 and S4 are de-energized to release clamps 44 and 48. A switch TR in line L7 is momentarily opened to de-energize solenoid S8 and cause cylinders 19 and 20 to open arms 17 and 18. When the arms 17 and 18 open, one of them will close switch LS6 in line L3 to energize relay AO. Relay AO opens its normally closed contact in line L2 to de-energize solenoid S7 and relay ST. When solenoid S7 is de-energized cylinder 16 moves slide 15 with base 14 thereon upwardly from the banded bundle. When slide 15 reaches its upper position it closes switch LS5 in line L4. This energizes solenoid S3 and cylinder 66 retracts slide 63 to return tail slide 31 to its initial position. The other contact of switch LS5 in line L3 is opened when slide 15 is in its upper position to de-energize relay AO. The system is now ready for another cycle of operation. It will be understood that the system may be made fully automatic through the substitution of appropriate relays and sensing devices to eliminate the switches CT and TR if so desired.

Figure 15:
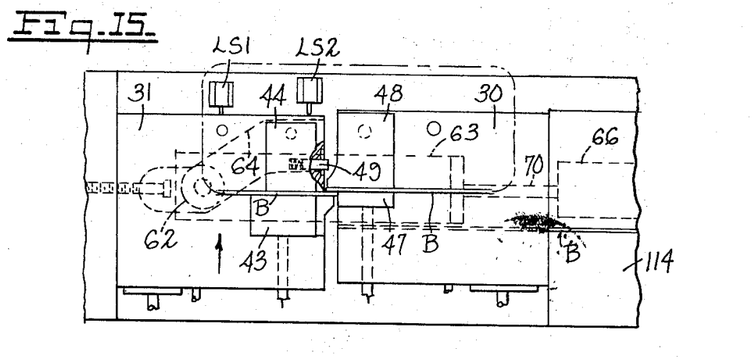
FIG. 15 is a view similar to FIG. 6 showing an alternate arrangement of the invention.

FIG. 15 exemplifies a modified form of the invention in which the ends of the wire are lap welded. The operation is the same as that previously described except that slide 30 need not be retracted, and limit switch LS2 is positioned to sense the final movement of slide 31 and terminate the welding operation.

The structure shown in FIGS. 4 – 15 may be embodied in either a position above the article to be banded as shown in FIGS. 1 – 3 or therebelow as shown in FIGS. 4 – 15.

Another embodiment of the invention is shown in FIGS. 18 – 21, in which similar parts to those previously disclosed are identified by similar reference numerals advanced by one hundred.

A tail slide 131 is movable transversely of a base 114 on guides 90 and carries a clamping cylinder 152 to clamp a wire therein in a manner previously described.

A nose slide 130 is movable a slight distance along the base 114 and guide 91 under the influence of springs 92 in a retracting direction, and by shoulder 184 engaging lug 185 in an advancing direction. A cylinder 159 in slide 130 pivots a lever 154 about pin 156 to close and open movable clamping member 148.

Slide 166 which carries cam roller 162 is actuated by the rod 170 of a cylinder to move tail slide 130 transversely of base 114. Slide 166 has a two level cam slot 93 defined in one side along the length thereof. Slot 93 receives a roller 94 therein carried by a locking member 95 which extends into a slot 96 in slide 130.

As slide 166 is moved forward to produce transverse movement of slide 131, roller 94 will move to the lower level of slot 93 carrying member 95 therewith aned out of slot 96. Then springs 92 acting on surfaces provided by pins 97 depending from slide 130 retract slide 130. This permits the ends of the wire to move into alignment. Then shoulder 184 abuts lug 185 and urges the molten ends of the wire into engagement. The overall operation is the same as that previously described.

Where the base of the machine is below the article, means, not shown, are provided for lifting the article and the bands thereon from the nose and tail slides.

It may thus be seen that the objects of the invention set forth as well as those made apparent are efficiently attained. While preferred embodiments of the invention have been set forth for purposes of disclosure other embodiments of the invention as well as modifications to the disclosed embodiment which do not depart from the scope of the invention may occur to others skilled in the art. Accordingly, the appended claims are intended to cover all embodiments and modifications of the invention which do not depart from the spirit and scope thereof.

I claim:

1. A banding machine comprising a guideway for guiding banding wire from a supply thereof about an object, means for feeding wire to said guideway, first clamping means, sensing means responsive to the leading end of the wire encircling the object for causing said first clamping means to hold the said leading end, means responsive to said sensing means for reversing said feeding means and tensioning a length of wire about the article, second clamping means holding the wire after tensioning thereof, means for moving said second clamping means toward said leading end and severing the wire from the supply during such movement, and means for initiating a welding current between the ends as the ends are moved toward each other, and means responsive to engagement of the ends for terminating the welding current.

2. The machine of claim 1 further comprising a base member, first and second members on said base, said first member defining a first passage for wire therethrough from said feeding means, said second member defining a second passage therethrough past said second clamping means thereon, said first member defining another passage past said first clamping means offset from said second passage, said second member being movable on said base to sever the wire and move the severed end toward the leading end in said first clamping means in the same motion.

3. The machine of claim 2 wherein said first member is slidable on said base in a direction to and from said second member, means for moving said second member transversely of said base, and means responsive to movement of the second member for retracting said first member to permit alignment of the leading and severed ends of the wire.

4. The machine of claim 3 further including means responsive to said second member reaching a position for alignment of the ends for actuating said means for initiating a welding current.

5. The machine of claim 4 wherein said means for moving said second member also advances said first member after retraction thereof to urge molten ends of the wire together after initiation of the welding current.

6. The machine of claim 3 further comprising first and second clamp actuating means carried by said first and second members respectively, a contact carried by said second member, means responsive to the leading edge of the wire striking said contact for operating said first clamp actuating means to clamp the leading edge of the wire, and means responsive to tensioning of the wire for operating said second clamp actuating means.

7. The machine of claim 2 wherein said second member carries a severing means, and movement of said second member on said base moves said severing means past said first passage to sever the wire.

8. The machine of claim 3 further including means biasing said first member in a direction to retract it from said second member, means h0lding said first member against retractive movement, said holding means being responsive to movement of said second member to release said first member and permit retraction thereof by said biasing means.

9. The machine of claim 1 further including means for releasing said first and second clamping means a predetermined time after the ends of the wire have been joined.

10. The machine of claim 1 wherein said first and second clamping means include first and second welding electrodes.

11. A method of tying an object with banding wire from a length thereof comprising the steps of passing a wire about the object and clamping one end thereof with a welding electrode, tensioning the wire and clamping it intermediate the ends thereof with another welding electrode, laterally displaced from the first electrode, severing the wire adjacent the second electrode and moving the ends toward each other, and energizing the electrodes to pass a welding current across the ends of the band while moving the ends into engagement.

12. The method of claim 11 wherein the step of moving the ends toward each other includes the step of slightly retracting the leading end and moving the severed end into axial alignment with the leading end.

13. A banding machine comprising a generally circular guideway for directing a length of wire about an object, a base member, means for feeding a length of wire across said base member into said guideway, first and second members movably mounted on said base member, means responsive to the leading end of the wire engaging a stop on one of said members for causing first holding means on the first of said members to engage and hold said wire adjacent the free end thereof, means for reversing said feeding means to draw the wire about the object, second holding means on said second member, wire severing means on said second member, means for moving said second member on said base member transverse to the path of the wire to sever the banding length from the source and align the severed end with the leading end, means responsive to movement of said second member for slightly retracting said first member as said ends are moved into alignment, and means responsive to said second member reaching a position of end alignment of the wire for advancing said first member toward said second member and applying a welding current across the ends of the wire.

14. The machine of claim 13 wherein said first member is advanced after alignment of the ends of the wires to urge the ends into engagement as they are welded.

15. The machine of claim 14 further including means for releasing said first and second holding means a predetermined interval after termination of the welding operation.

* * * * *